(12) United States Patent
Raifel et al.

(10) Patent No.: US 7,856,087 B2
(45) Date of Patent: Dec. 21, 2010

(54) CIRCUIT METHOD AND SYSTEM FOR TRANSMITTING INFORMATION

(75) Inventors: Mark Raifel, Ra'anana (IL); Guy Shterlich, Moshav Yad-Natan (IL)

(73) Assignee: AudioCodes Ltd., Lod (IL)

( * ) Notice: Subject to any disclaimer, the term of this patent is extended or adjusted under 35 U.S.C. 154(b) by 1147 days.

(21) Appl. No.: 11/513,298

(22) Filed: Aug. 29, 2006

(65) Prior Publication Data

US 2008/0075269 A1 Mar. 27, 2008

(51) Int. Cl.
*H04M 1/24* (2006.01)
(52) U.S. Cl. ...................................... 379/3; 379/392.01
(58) Field of Classification Search .................. 379/3, 379/392.01, 392
See application file for complete search history.

(56) References Cited

U.S. PATENT DOCUMENTS

| 2003/0174661 | A1* | 9/2003 | Lee | 370/286 |
| 2003/0235312 | A1* | 12/2003 | Pessoa et al. | 381/66 |
| 2004/0091099 | A1* | 5/2004 | Akie | 379/406.01 |
| 2006/0182291 | A1* | 8/2006 | Kunieda et al. | 381/110 |
| 2009/0240492 | A1* | 9/2009 | Zopf et al. | 704/219 |

OTHER PUBLICATIONS

Altman, E., Avrachenkov, K., Barakat, C. Impact of Bursty losses on TCP performance, May 30, 2000.
Berger J. M., Mandelbrot B. A New Model for Error Clustering in Telephone Circuits. IBM J R&D Jul. 1963.
Bolot J. C., Vega Garcia A. The case for FEC based error control for packet audio in the Internet, ACM Multimedia Systems 1997.
Boutremans C., Iannaccone G., Diot C., Impact of Link Failures on VoIP Performance, Sprint Labs technical report IC/2002/015.
Cain J. B., Simpson R. S., The Distribution of Burst Lengths on a Gilbert Channel, IEEE Trans IT-Sep. 15, 1969.
Clark A., Modeling the Effects of Burst Packet Loss and Recency on Subjective Voice Quality, IPtel 2001 Workshop.
Drajic D., Vucetic B., Evaluation of Hybrid Error Control Systems, IEE Proc F. vol. 131, Apr. 2, 1984.
Technical University Berlin Telecommunication Networks Group—A Gilbert-Elliot Bit Error Model and the Efficient Use in Packet Level Simulation Jean-Pierre Ebert, Andeas Willig, Berlin, Mar. 1999, Editor. Dr-Ing Adam Wolisz.
Jiang W., Schulzrinne H., Modeling of Packet Loss and Delay and their effect on Real Time Multimedia Service Quality, NOSSDAV 2000.
Lewis P, Cox D., A Statistical Analysis of Telephone Circuit Error Data. IEEE Trans COM-14 1966.
Mertz P., Statistics of Hyperbolic Error Distributions in Data Transmission, IRE Trans CS-9, Dec. 1961.
Sanneck H., Carle G., A Framework Model for Packet Loss Metrics Based on Loss Runlengths. Proc ACM MMCN Jan. 2000.
Yajnik M., Moon S., Kurose J., Towsley D., Measuring and Modelling of the Temporal Dependence in Packet Loss, UMASS CMPSCI Tech Report #98-78 , 1999.

(Continued)

*Primary Examiner*—Creighton Smith
(74) *Attorney, Agent, or Firm*—Eitan Mehulal Law Group

(57) ABSTRACT

Disclosed is an echo suppresser or cancellation circuit including a speech signal extrapolation unit. The speech extrapolation unit may provide extrapolated signal segment approximations to an echo segment replacement unit. The echo segment replacement unit may replace a segment of a first speech signal suspected of being corrupted with an echo component of a second signal using the extrapolated signal segment approximated to represent the corrupted signal segment.

14 Claims, 6 Drawing Sheets

OTHER PUBLICATIONS

ITU-T Recommendation G.711(Sep. 1999)—Appendix I Pulse code modulation (PCM) of voice frequencies. Appendix I: A high quality low-complexity algorithm for packet loss concealment with G.711.

T1.521-1999-Packet Loss Concealment for Use with ITU-T Recommendation G.711 (American National Standard).
T1.521a-2000-Supplement to T1.521-1999.

* cited by examiner

Speech part after NLP clipping:

Speech part after concealment process:

CIRCUIT METHOD AND SYSTEM FOR TRANSMITTING INFORMATION

FIELD OF THE INVENTION

The present invention relates generally to communication systems and more particularly to echo cancellers, echo cancellation circuits and echo cancellation methods.

BACKGROUND OF THE INVENTION

Echo in a communication system, such as the one shown in FIG. 1, is commonly characterized as the return of a part of a transmitted signal from an end user back to the originator of the transmitted signal after a delay period. As is known in the art, a near end user transmits an uplink signal to a far end user. Conversely, the near end user receives a downlink signal from the far end user. For example, echo at the near end occurs when the near end user originates an uplink signal on an uplink path, and a part of the transmitted signal is reflected at the far end as an echo signal on a downlink path back to the near end. Echo at the far end occurs when the far end user originates a downlink signal on the downlink path, and a part of the transmitted signal is reflected at the near end as an echo signal on the uplink path back to the far end. The reflection of the transmitted signal may occur due to a number of reasons, such as an impedance mismatch in a four/two wire hybrid at the far end or feedback due to acoustic coupling in a telephone, wireless device or hands-free speaker phone. An echo signal corresponding to the delayed transmitted signal is perceived as annoying to the near end user and, in some cases, can result in an unstable condition known as "howling."

Echo cancellers are desirable at any echo generating source at both the near end and at the far end in an attempt to eliminate or reduce the transmission of echo signals. Echo cancellers may be employed in wireless devices, such as personal data assistants (PDAs), cellular phones, two-way radios, car-kits for cellular telephones, car phones and other suitable devices that can move throughout a geographic area. Additionally, echo cancellers may be employed in wireline devices, such as hands-free speaker phones, video and audio conference phones and telephones otherwise commonly referred to in the telecommunications industry as plain old telephone system (POTS) devices. Hands-free speaker phones typically include a microphone to produce the uplink signal, a speaker to acoustically produce the downlink signal, an echo canceller to cancel the echo signal and a telephone circuit.

Echo cancellers, such as the one shown in FIG. 2, attempt to cancel the echo signals produced at the near end when the far end is transmitting by generating echo estimation data corresponding to a portion of an amplified downlink audio signal traveling through the acoustic coupling channel between the speaker and the microphone. There is shown in FIG. 2 a simplified block diagram of an equipment configuration for one terminal of a communication link which includes a near end hybrid, operative in accordance with some embodiments of the present invention. The communication link may have a near-end comprising a telephone or other voice communication device 2, a four-to-two wire hybrid circuit 3, and an echo canceller circuit 4 including a filter 5 and a Non-Linear Processor ("NLP") 6. A far-end connected to communication network 23, can be similarly configured but is not illustrated in FIG. 2. During a conversation between a near-end user and a far-end user, the far end signal, x, which contains both the far-end user's speech and incidental background noise, may enter the near-end as signal x at node 9.

Echo cancellers, such as the ones shown in FIGS. 1 and 2 may model the acoustic coupling channel and in response generates the echo estimation data through the use of an echo canceller adaptive filter. Echo cancellers may use an adaptive filter employing modeling techniques using for example a Least Mean Squared (LMS) finite impulse response (FIR) filter having a set of weighting coefficients to model the acoustic coupling channel or other similar modeling techniques known in the art. An echo canceller's adaptive filter may attempt to subtract the echo estimation data from pre-echo canceller uplink data received by the microphone in order to produce post-echo canceller uplink data. The post-echo canceller uplink data may be used by the echo canceller adaptive filter to dynamically update the weighting coefficients of the finite impulse response filter.

FIG. 1 illustrates a exemplary communication link between two telephones or other voice communication devices 24 and 25. The link is comprised of a near-end, a far-end, and a communication network 23 that interconnects the near-end and far-end. The near-end may have a user voice communication device 24, a hybrid circuit 26, and an echo canceller circuit 4A. Similarly, the far-end 22 may have a user voice communication device 25, a hybrid circuit 27, and an echo canceller circuit 4B. Both echo canceller circuits, 28 and 29, may be analogous to the echo canceller 4 shown in FIG. 2.

Far-end signal power, X, is received by the near-end. Signal Y is the coupled echo signal from the far-end signal as well as the near-end signal produced by communication device 24. This near-end signal contains both the speech of the near-end telephone user and the background noise of the user's environment. Together, the near-end signal and far-end echo signal are represented by Y.

The far-end signal is provided to the four-to-two wire hybrid circuit 3 (FIG. 2) and then to near-end communication device 2. Due to the unavoidable non-linearity present in the hybrid circuit 3, some portion of the far-end signal power is coupled onto the output 7 of the hybrid circuit 3 as an echo. A composite signal y exists at node 7 containing the echo signal and the combined speech of the near-end user and any incidental background noise from the near-end user's environment. A filter having a filter length period selected and designed to be longer than the hybrid dispersion time may be used prior to power level measurements at 7 to allow the echo canceller 4 to operate properly.

Echo canceller 4 may synthesize the expected value e of the echo signal in adaptive filter 5, and subtracts this value at 10 from the composite signal y existing at node 7. The resulting difference signal, d, existing at node 14, is intended to contain only the near-end signal s originating from telephone 2. Difference signal, d, may be provided to the far-end telephone through the communications network 23.

Methods of measuring the echo return loss typically measure a signal at node 9, where the signal power from the far-end would normally exist. A measurement of the signal power, x, at node 9 is made. Additionally, the power level of the composite signal y, comprised of the coupled echo signal and any signal s generated by the near-end telephone 2, is measured at node 7. The measurement can be made when little-to-no signal is being generated at near end telephone 2. Assuming the signal power of any signal generated by the near-end telephone is very small in comparison to the coupled echo signal power, the ratio of the measured test signal power x to the measured power level y provides an estimate of the echo return loss (ERL) for the near-end 8. The magnitude of echo return loss is usually measured as a difference in dB between signal x and signal y. Echo return loss may be measured dynamically during the course of a telephone conversation.

Echo is an important factor in communications which include a hybrid between a four wire communication network 23 and the end terminals 24 and 25 as illustrated in FIG. 1. When echo is present, it is preferable to eliminate the echo. To eliminate the echo, the magnitude of the echo must be determined. One way of determining the magnitude of the echo is through echo return loss (ERL) estimation. A high echo return loss means that there is very little echo because most of the energy from the far end has been lost when the near end signal combined with echo is measured.

A typical echo canceller, as illustrated in FIG. 1, includes an adaptive finite impulse filter FIR 5. Under the control of an adaptation algorithm, FIR filter 5 models the impulse response of the echo path. A non-linear processor (NLP) 6 can be used to remove residual echo that may remain after linear processing of the input signal. The echo canceller may also typically include a double talk detector 11. Double talk occurs when both far end and near end speech are present at the same time. A double talk detector 11 can also be used to control and inhibit the adaptation process of the FIR 5 and/or the NLP 6 when double talk is present and it may be undesirable to cancel or suppress echo because double talk will be suppressed.

In the echo canceller, the signal y is the perceived near end signal. Signal y is a combination of the actual near end signal s and the echo from the far end signal x which comes through hybrid 3. The output signal d is the signal y less the echo estimate e generated by the adaptive filter 5. The adaptive filter 5 is programmed to generate an output signal e that is as close to the echo as possible so that the echo is largely cancelled by the echo estimate e and the difference signal d closely resembles the generated near end signal s. The NLP 6 controls the amount of signal d that is transmitted to the far end. When there is no near end signal s, or a large echo over riding near end signal is present, NLP 6 can provide comfort noise to the far end instead of near end signal so as to prevent any possible uncancelled echo from being transmitted. When a valid s exists, NLP opens so as to let the far end hear the signal. False detection of a lack of near end signal s can cause clipping of speech and failure to detect echo can result in echo leak through the NLP. The NLP as an on/off switch can result in abrupt audible changes which are undesirable in speech communications.

There is a need in the field of communication for improved methods and circuits for echo cancellation.

SUMMARY OF THE INVENTION

According to some embodiments of the present invention, there is provided an echo suppresser or cancellation circuit including a speech signal extrapolation unit. The speech extrapolation unit may provide extrapolated signal segment approximations to an echo segment replacement unit. The echo segment replacement unit may replace a segment of a first speech signal suspected of being corrupted with an echo component of a second signal using the extrapolated signal segment approximated to represent the corrupted signal segment.

According to some embodiments of the present invention, the extrapolated signal segment may be produced using speech prediction of conventional packet loss concealment methods. Either the residual signal and/or the output clean signal can be used as an input for the extrapolation process. Any methods known today or to be devised in the future for speech signal extrapolation may be applicable to the present invention.

According to some embodiments of the present invention, the segment replacement unit may be functionally associated with a non-linear processor. A non-linear processor according to the present invention may replace signal segment suspected of being corrupted with an echo with a signal segment extrapolated using speech prediction of conventional packet loss concealment methods. Either the residual signal and/or the output clean signal can be used as an input for the extrapolation process. Any methods known today or to be devised in the future for speech signal extrapolation may be applicable to the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
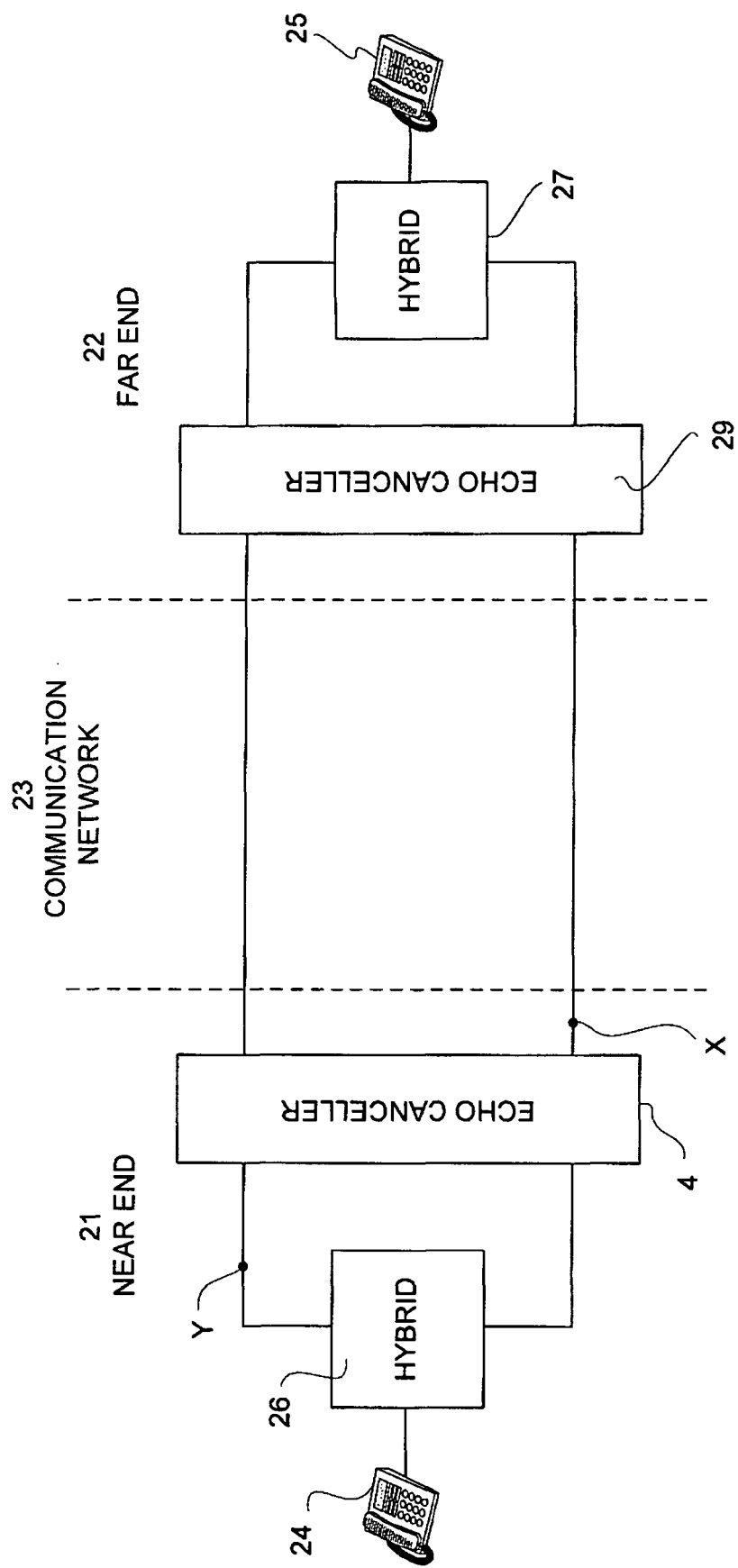
FIG. 1 shows a diagram of an exemplary voice communication link across an exemplary voice communication network, including echo suppressers on both ends of the link.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein. One of ordinary skill in the art should understand that the described invention may be used for all kinds of wireless or wire-line system According to some embodiments of the present invention, there is provided an echo suppresser or cancellation circuit including a speech signal extrapolation unit. The speech extrapolation unit may provide extrapolated signal segment approximations to an echo segment replacement unit. The echo segment replacement unit may replace a segment of a first speech signal suspected of being corrupted with an echo component of a second signal using the extrapolated signal segment approximated to represent the corrupted signal segment.

According to some embodiments of the present invention, the extrapolated signal segment may be produced using speech prediction of conventional packet loss concealment methods. Either the residual signal and/or the output clean signal can be used as an input for the extrapolation process. Any methods known today or to be devised in the future for speech signal extrapolation may be applicable to the present invention.

According to some embodiments of the present invention, the segment replacement unit may be functionally associated with a non-linear processor. A non-linear processor according to the present invention may replace signal segment suspected of being corrupted with an echo with a signal segment extrapolated using speech prediction of conventional packet loss concealment methods. Either the residual signal and/or the output clean signal can be used as an input for the extrapolation process. Any methods known today or to be devised in the future for speech signal extrapolation may be applicable to the present invention.

Figure 3:
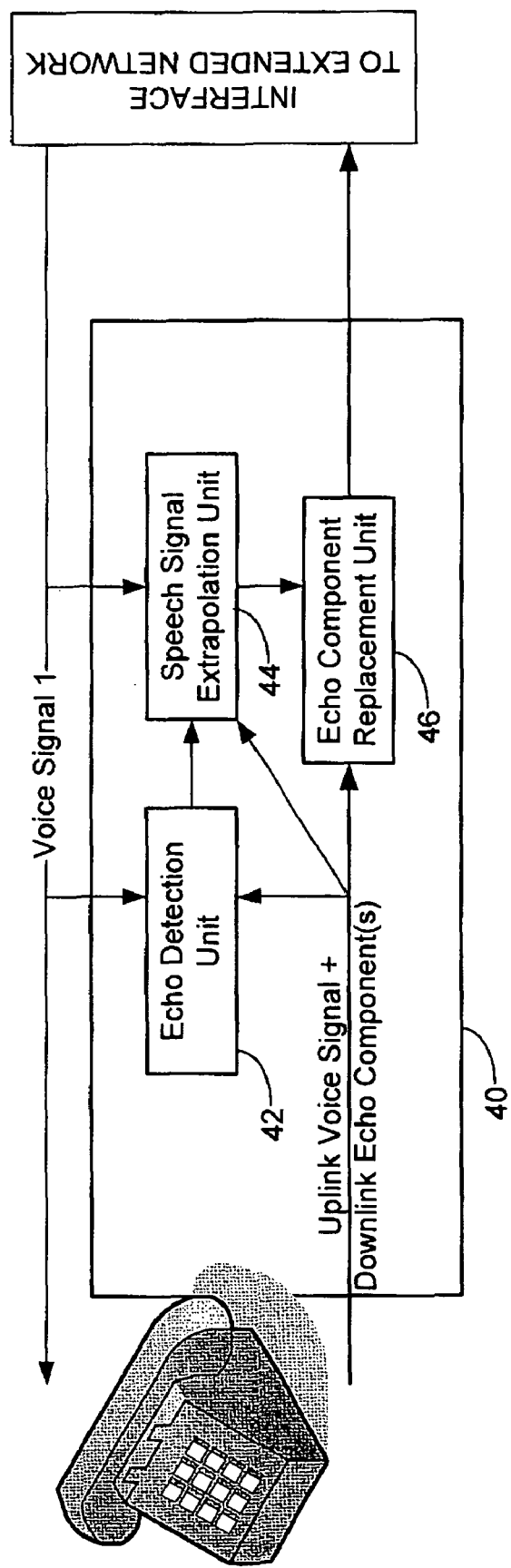
FIG. 3 shows a block diagram of an echo suppresser according to some embodiments of the present invention.

Turning now to FIG. 3, there is shown a block diagram of an echo suppresser according to some embodiments of the present invention. The echo suppresser 40 may include an echo detection unit 42, a speech signal extrapolation unit 44 and an echo component replacement unit 46 which may replace segments of an uplink speech signal suspected of being corrupted with a downlink speech signal echo component using an approximate uplink speech signal component. The operation of the echo suppresser of FIG. 3 may be described in conjunction with the steps of the flow chart shown in FIG. 5, which flowchart includes the steps of a method of echo suppression according to some embodiments of the present invention.

In the event that the echo detection unit 42 determines that there is an echo component from a downlink echo signal within an uplink speech signal (FIG. 5, step 1000), the echo detection unit may produce a signal indicating one or more parameters of the echo component. The parameters provided may include location within the uplink speech signal, energy level of the echo component, etc. Any circuits or methodology for echo detection, known today or to be devised in the future, may be applicable to the present invention.

The speech signal extrapolation unit 44 may approximate one or more speech signal components (FIG. 5, step 2000) associated with the uplink signal, either continually or only upon receiving an indication that an echo component may exist within an uplink speech signal. Any circuits or methodology for speech signal extrapolation, known today or to be devised in the future, may be applicable to the present invention.

Figure 5A:
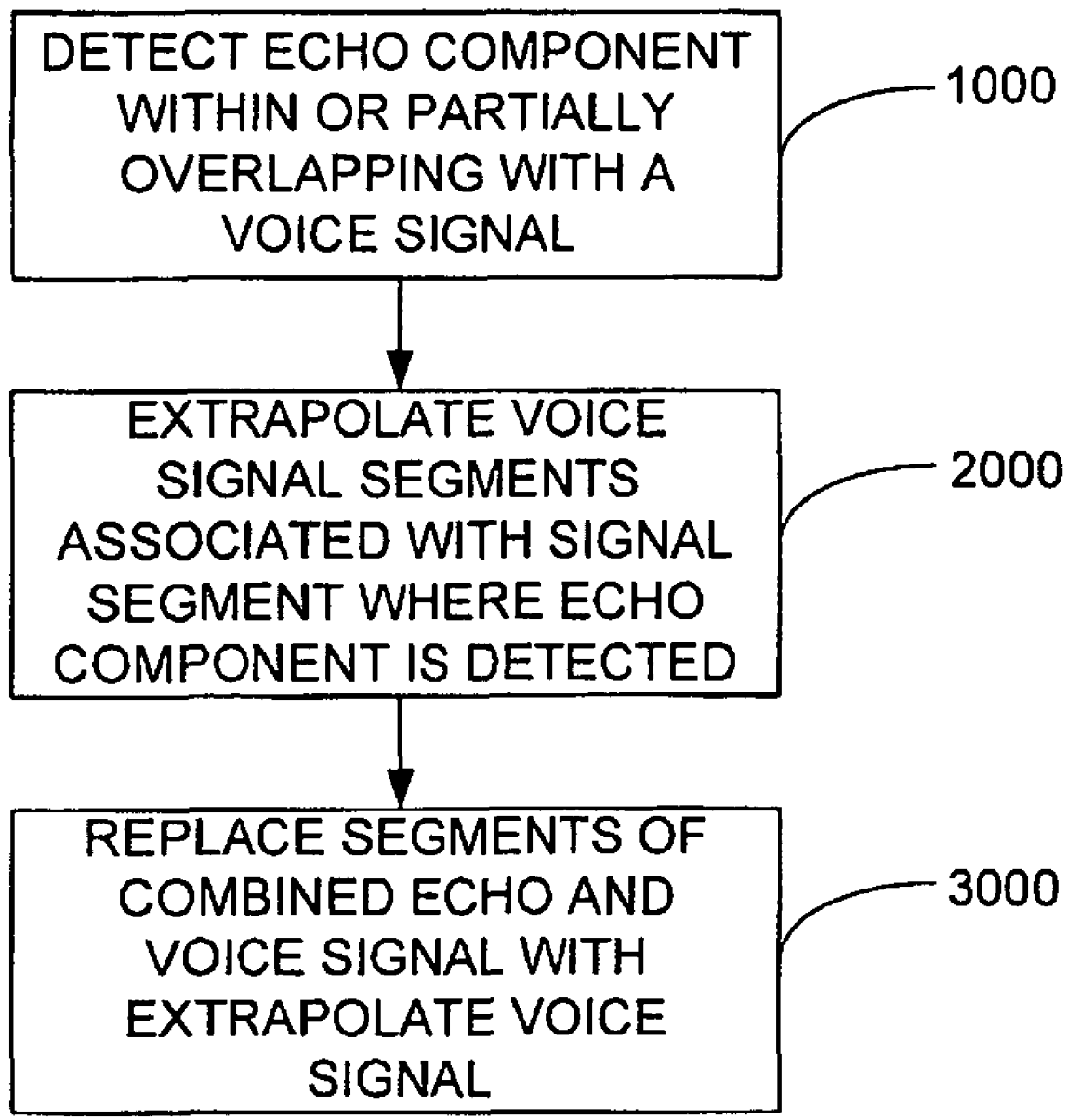
FIG. 5 is a flowchart including the steps of a method of echo suppression according to some embodiments of the present invention.

The echo component replacement unit 46 may replace a segment of an uplink speech signal suspected of being corrupted with an echo component of a downlink speech signal (FIG. 5, step 3000). The location of the component suspected of being corrupted may be provided by the echo detection unit 42, and the approximated speech signal segment with which the segment suspected of being corrupted is replaced may be provided by the speech signal extrapolation unit 44. FIG. 6 shows a set of signal graphs illustrating signal processing according to some aspects of the present invention. The signal segment replacement described above is illustrated within FIG. 6. Any circuits or methods of signal segment replacement, known today or to be devised in the future, may be applicable to the present invention.

Figure 2:
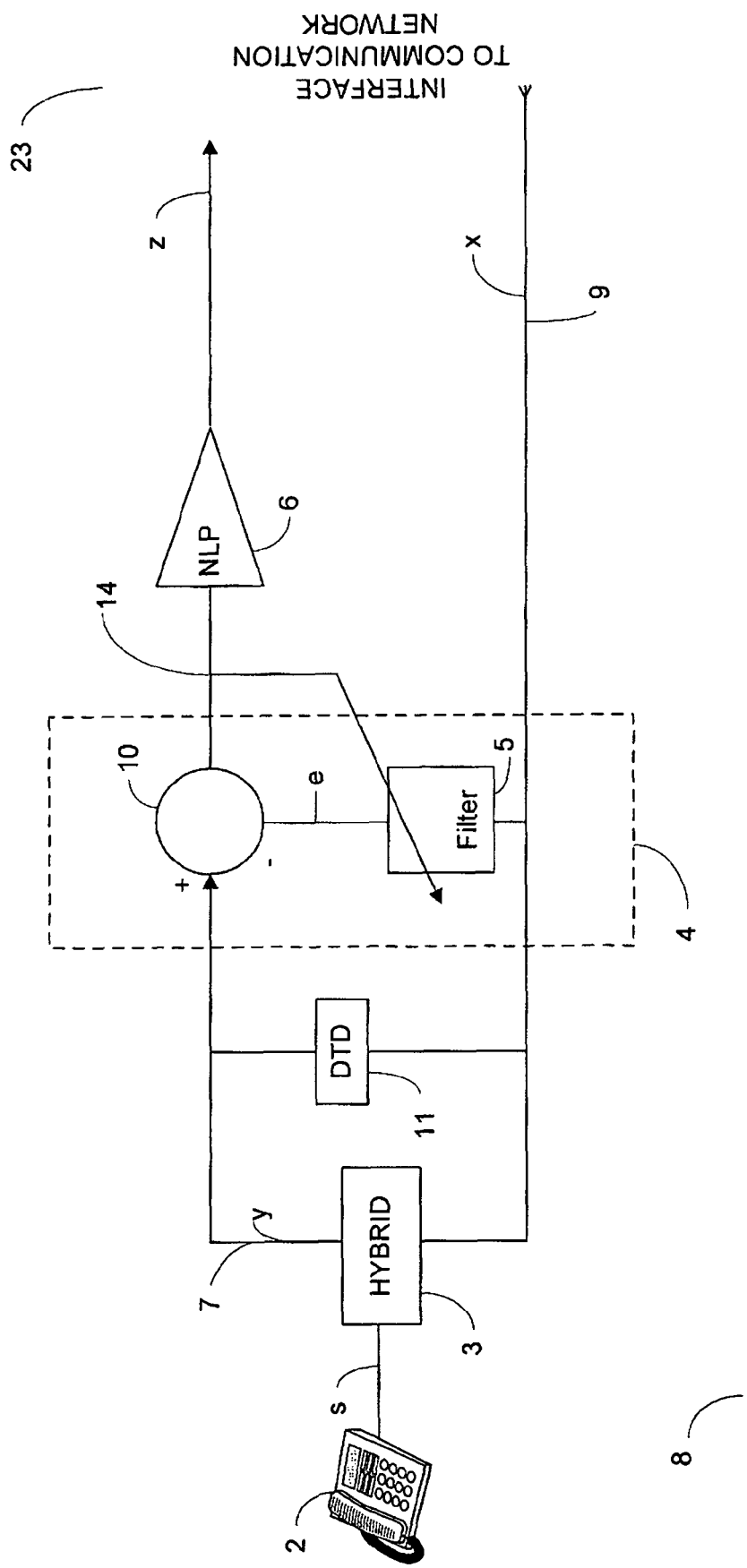
FIG. 2 shows a simplified circuit diagram of an echo suppresser connected to one end of a voice communication link established over a communication network such as the one exemplified in FIG. 1.
Figure 4:
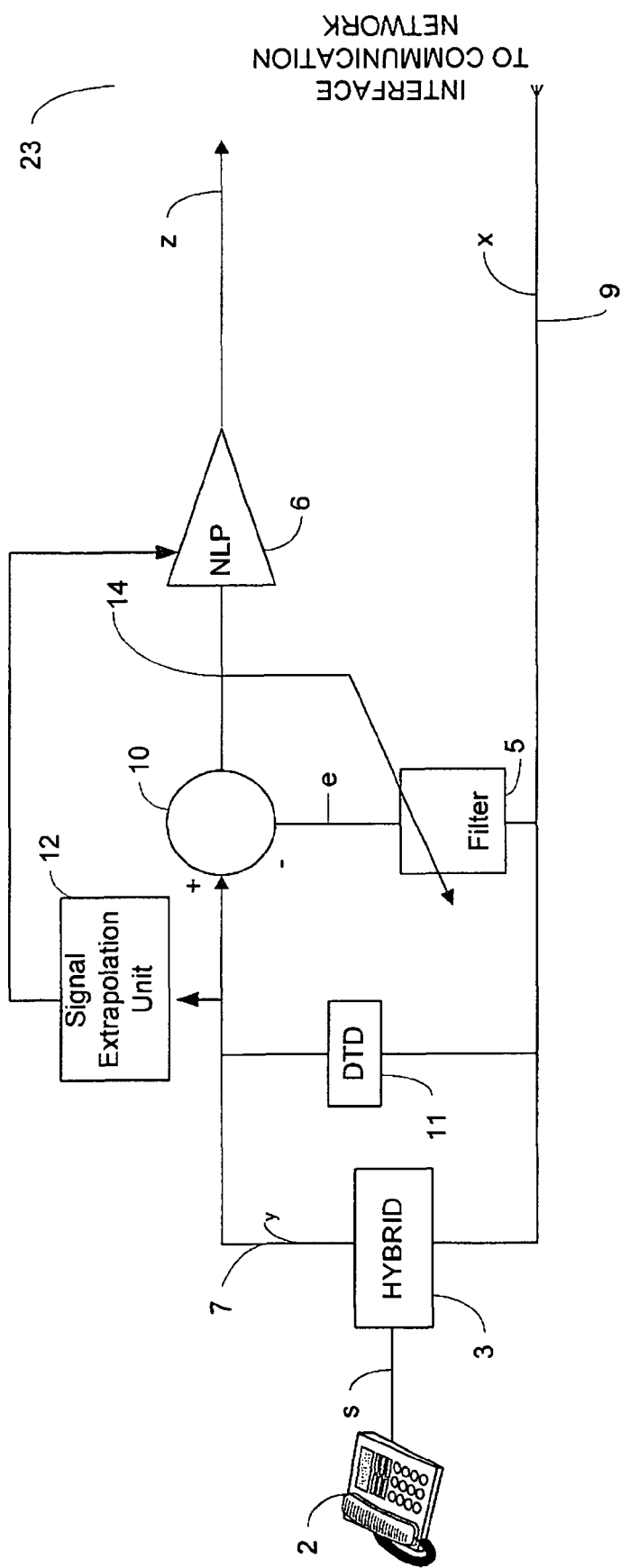
FIG. 4 shows a simplified circuit diagram of an echo suppresser according some embodiments of the present invention in which a non-linear processor may be utilized.

FIG. 4 shows a simplified circuit diagram of an echo suppresser according some embodiments of the present invention in which a non-linear processor may be utilized. The embodiment shown in FIG. 4 is substantially analogous to the echo suppressers shown and described as part of FIGS. 1 and 2, with the addition of a speech signal extrapolation unit 12. Instead of using comfort noise to replace speech signal segments suspected of being corrupted, the suppresser of FIG. 4 uses an approximated speech signal segment generated by the speech signal extrapolation unit 12.

Figure 6A:
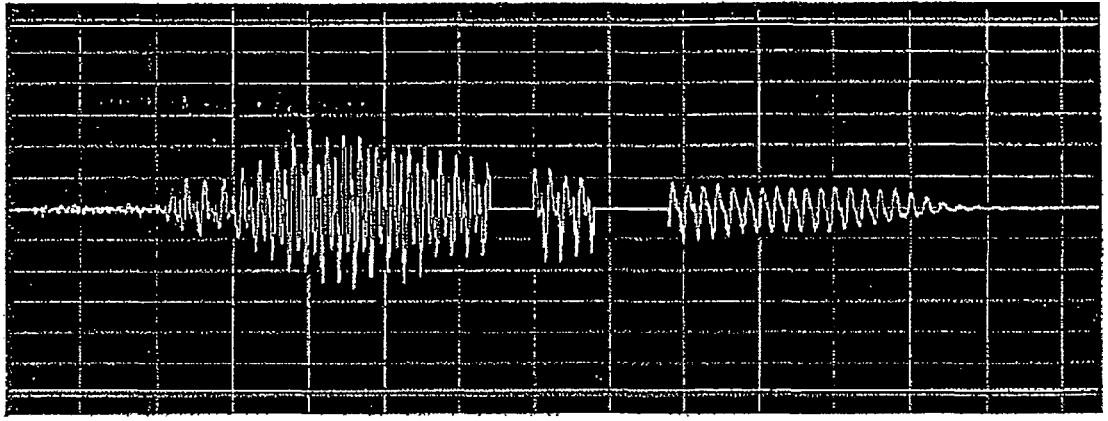
FIGS. 6A and 6B shows a set of signal graphs illustrating signal processing according to some aspects of the present invention.
Figure 6B:
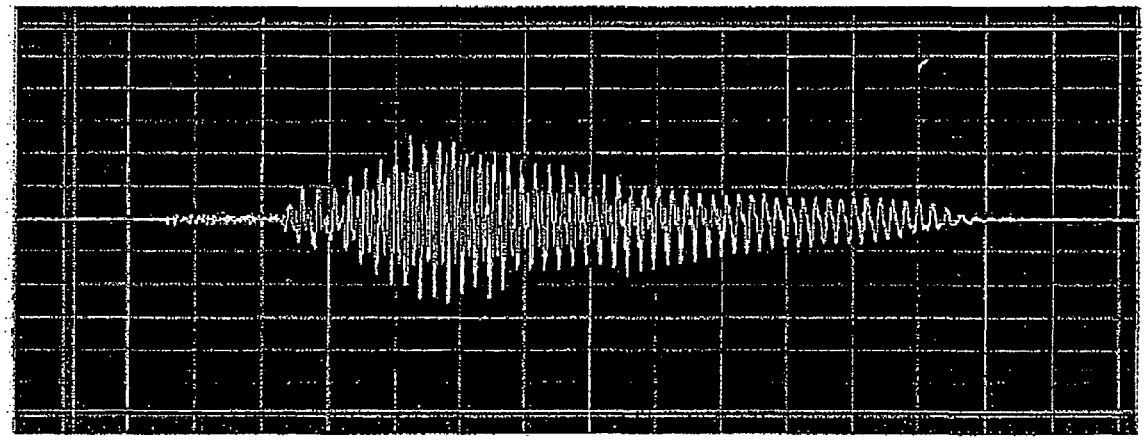

Turning now to FIGS. 6A and 6B, there is shown a set of signal graphs illustrating signal processing according to some aspects of the present invention. According to further embodiments of the present invention, FIG. 6A shows a voice signal after NLP (non-linear processor) clipping, while FIG. 6B shows the same voice signal after a concealment process.

According to yet further embodiments of the present invention, the concealment process may also be referred to as "speech prediction method", or as "packet loss concealment method". Any methods of speech prediction and/or packet loss concealment, known today or to be devised in the future, may be applicable to the present invention. Some known methods in the art are taught by the below listed publications, and are hereby incorporated by reference:

Altman, E., Avrachenkov, K., Barakat, C., TCP in the Presence of Bursty Losses, Performance Evaluation 42 (2000) 129-147

Berger J. M., Mandelbrot B. A New Model for Error Clustering in Telephone Circuits. IBM J R&D July 1963

Blank H. A, Trafton P. J., A Markov Error Channel Model, Proc Nat Telecomm Conference 1973

Bolot J. C., Vega Garcia A. The case for FEC based error control for packet audio in the Internet, ACM Multimedia Systems 1997

Boutremans C., Iannaccone G., Diot C., Impact of Link Failures on VoIP Performance, Sprint Labs technical report IC/2002/015

Cain J. B., Simpson R. S., The Distribution of Burst Lengths on a Gilbert Channel, IEEE Trans IT-15 September 1969

Clark A., Modeling the Effects of Burst Packet Loss and Recency on Subjective Voice Quality, IPtel 2001 Workshop Drajic D., Vucetic B., Evaluation of Hybrid Error Control Systems, IEE Proc F. Vol 131, 2 Apr. 1984

Ebert J-P., Willig A., A Gilbert-Elliott Model and the Efficient Use in Packet Level Simulation. TKN Technical Report 99-002 [10] Elliott E. O., Estimates of Error Rates for Codes on Burst Noise Channels. BSTJ 42, September 1963

Elliott E. O. A Model of the Switched Telephone Network for Data Communications, BSTJ 44, January 1965

ETSI TIPHON TS 101 329-5 Annex E, QoS Measurements for Voice over IP

Gilbert E. N. Capacity of a Burst Noise Channel, BSTJ September 1960

ITU-T SG12 D.139: "Study of the relationship between instantaneous and overall subjective speech quality for time-varying quality speech sequences", France Telecom Jiang W., Schulzrinne H., Modeling of Packet Loss and Delay and their effect on Real Time Multimedia Service Quality, NOSSDAV 2000

Lewis P, Cox D., A Statistical Analysis of Telephone Circuit Error Data. IEEE Trans COM-14 1966

Mertz P., Statistics of Hyperbolic Error Distributions in Data Transmission, IRE Trans CS-9, December 1961

Sanneck H., Carle G., A Framework Model for Packet Loss Metrics Based on Loss Runlengths. Proc ACM MMCN January 2000

Yajnik M., Moon S., Kurose J., Towsley D., Measuring and Modelling of the Temporal Dependence in Packet Loss, UMASS CMPSCI Tech Report #98-78

ITU SG12 D.22 A framework for setting packet loss objectives for VoIP, AT&T October 2001

T1.521-1999—Packet Loss Concealment for Use with ITU-T Recommendation G.711 (American National standard)

T1.521a-2000—Supplement to T1.521-1999

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. An echo suppresser apparatus comprising:
   a speech signal extrapolation unit to provide extrapolated signal segment approximation to an echo segment replacement unit,
   wherein the speech signal extrapolation unit receives as input either a residual signal or an output clean signal.

2. The apparatus according to claim 1, wherein the echo segment replacement unit is to replace a segment of a first speech signal suspected of being corrupted with an echo component of a second signal using the extrapolated signal segment approximated to represent the corrupted signal segment.

3. The apparatus according to claim 1, wherein the echo segment replacement unit is functionally associated with a non-linear processor.

4. The apparatus according to claim 1, wherein the extrapolated signal segment is produced using one or more of:
   speech prediction method;
   packet loss concealment method.

5. An echo suppression system comprising:
   a speech extrapolation unit to provide extrapolated signal segment approximation to an echo segment replacement unit; and
   a communication device adapted to produce a speech signal,
   wherein the echo segment replacement unit is to replace a segment of a first speech signal suspected of being corrupted with an echo component of a second signal using the extrapolated signal segment approximated to represent the corrupted signal segment.

6. The system according to claim 5, wherein the echo segment replacement unit is functionally associated with a non-linear processor.

7. The system according to claim 5, wherein the extrapolated signal segment is produced using one or more of:
   speech prediction method;
   packet loss concealment method.

8. The system according to claim 5, wherein the speech signal extrapolation unit receives as input either a residual signal or an output clean signal.

9. A method of echo suppression comprising:
   replacing a segment of a first speech signal suspected of being corrupted with an echo component from a second speech signal using a signal segment extrapolated from the first speech signal.

10. The method according to claim 9, wherein the extrapolated signal segment is provided using a speech signal extrapolation unit.

11. The method according to claim 10, wherein said replacing takes place using a replacement unit.

12. The method according to claim 11, wherein the replacement unit is functionally associated with a non-linear processor.

13. The method according to claim 9, wherein the extrapolated signal segment is produced using one or more of:
    speech prediction method;
    packet loss concealment method.

14. The method according to claim 10, wherein the speech signal extrapolation unit receives as input either a residual signal or an output clean signal.

* * * * *